United States Patent [19]

Buddemeyer et al.

[11] 4,242,364
[45] Dec. 30, 1980

[54] DRY POWDERED NON-DAIRY FOOD COMPOSITION CONTAINING LIQUID FAT

[75] Inventors: Bruce D. Buddemeyer; William A. Neville; James S. Taylor; Richard G. Bourne, all of Kansas City, Mo.

[73] Assignee: R.G.B. Laboratories, Inc., Kansas City, Mo.

[21] Appl. No.: 970,938

[22] Filed: Dec. 19, 1978

[51] Int. Cl.³ ............................................. A23C 11/02
[52] U.S. Cl. ...................... 426/98; 426/103; 426/613; 426/658; 426/471
[58] Field of Search ................ 426/98, 103, 290, 307, 426/613, 658, 471

[56] References Cited

U.S. PATENT DOCUMENTS

| | | | |
|---|---|---|---|
| 2,694,643 | 11/1954 | Robinson et al. | 426/98 |
| 3,499,962 | 3/1970 | Wurzburg et al. | 426/98 X |
| 3,652,297 | 3/1972 | Peterson et al. | 426/98 |
| 3,764,346 | 10/1973 | Noznick et al. | 426/98 X |
| 3,924,018 | 12/1975 | Sims et al. | 426/98 X |
| 4,045,589 | 8/1977 | Petrowski et al. | 426/98 X |

Primary Examiner—Robert A. Yoncoskie

Attorney, Agent, or Firm—Schmidt, Johnson, Hovey & Williams

[57] ABSTRACT

A dried, non-dairy food composition such as a powdered coffee whitener is provided which contains liquid fat (at room temperature) encapsulated or enrobed by a specialized, carbohydrate-containing matrix. In preferred forms, polyunsaturated liquid fat can be used for dietary purposes, and the matrix can be protein-free if desired so that the composition is hypoallergenic. The encapsulating matrix is especially formulated to render the composition stable in both hot and cold aqueous emulsions to thereby prevent undue separation and coalescence of the fat or other undesirable properties. In preferred practice the matrix normally contains a carbohydrate such as corn syrup solids, an emulsifier system having at least two anionic emulsifiers, and other optional ingredients added for organoleptic or nutritional reasons. The composition is formulated by heating and mixing the fat with the matrix-forming ingredients, subdividing the fat into particles of no more than about three microns in diameter by homogenization, and spray drying the resultant blend to give the final dried composition.

17 Claims, No Drawings

DRY POWDERED NON-DAIRY FOOD COMPOSITION CONTAINING LIQUID FAT

BACKGROUND OF THE INVENTION

1. Field of the Invention

The present invention is broadly concerned with dried, non-dairy food compositions which can be used in lieu of traditional dairy products. More particularly, the invention is concerned with dry non-dairy compositions which comprise finely divided liquid or pourable fat particles separately enrobed or encapsulated by a carbohydrate-containing matrix. In preferred forms, a protein-free matrix is employed having a multiple component emulsifier system, along with polyunsaturated liquid fat. This gives a hypoallergenic, dietetic composition which is stable in both hot and cold aqueous emulsions and has organoleptic properties essentially identical with those of conventional dairy counterparts.

2. Description of the Prior Art

Spray dried non-dairy food compositions such as dried milks and particulate coffee whiteners or cream substitutes have been available in the past. In the case of coffee whiteners, for example, a number of commercially available compositions are in widespread use both in the home and in restaurants or other institutions. Likewise, non-dairy milks which can be reconstituted with water have also been obtainable for similar purposes.

Notwithstanding the wide availability and significant commercial success of prior ersatz non-dairy products, a number of unresolved problems remain. For example, many of these products contain milk protein as a component thereof, thus making the products totally unsuitable for those having an intolerance for such protein.

In addition, such prior products have, without known exception, required the use of relatively high melting point fats or oils which are not liquid at room temperature. Such oils and fat are highly saturated, and are therefore not desirable from a dietetic standpoint. However, prior attempts at using relatively low melting point polyunsaturated oils or fat have been unsuccessful. These failures have stemmed from the inability to spray dry liquid fats or oils and successfully enrobe or encapsulate the fat particles with a matrix. Generally, it has been found that drying is difficult or impossible with liquid fat, or if drying is accomplished the products are very unstable in aqueous emulsion. A common defect in the case of attempts to make liquid fat dried coffee whiteners is that, simply put, they do not whiten coffee but rather the oil tends to coalesce and give a very unsatisfactory result.

Prior patents and publications of background interest include the following: U.S. Pat. Nos. Re. 25,264, U.S. Pat. Nos. 2,923,628, 1,444,812, 2,933,393, 3,716,378, 3,628,972, 3,592,940, 3,097,947, 2,645,579, 1,302,486, 2,832,686, 3,102,035, 1,220,010, 2,493,324, 2,657,142, 2,650,879, 3,223,532, 3,488,198, 3,695,889, Dairy-Like Formulations provided by Central Soya, Chemurgy Division, of Chicago, Ill., and articles entitled *The Role of Soy Proteins in Milk-like Products*, Parts I and II, presented at the 29th Annual Meeting of the Pennsylvania Approved Dairy Laboratory Directors Association, Apr. 23, 1968.

SUMMARY OF THE INVENTION

The present invention overcomes the difficulties outlined above and provides solid, dried, non-dairy food products in particulate form which contain a quantity of liquid fat (i.e., fat which is liquid or pourable at room temperature). Broadly, a given food particle in accordance with the invention comprises a particle of fat having a diameter of no more than about three microns, and an encapsulating, carbohydrate-containing matrix around the fat particle in order to render the overall food particle stable in aqueous emulsion. Preferably, the matrix contains a water soluble carbohydrate material and an appropriate emulsifier or emulsifier system.

In particularly preferred forms, the liquid fat has a melting point of no more than about 90° F., and the fat particles have a diameter of less than about one micron. Also, the most preferred carbohydrate is selected from the group consisting of corn syrup and malto-dextrins thereof having a D.E. (Dextrose Equivalent) of from about 15 to 50.

Generally speaking, in order to meet the dictates of the present invention, the particulate, dried, fat-containing products must be stable in aqueous emulsion such that two separate tests are met: (1) a 25% by volume dispersion of the particles in water, when stored at 40° F. for 72 hours, exhibits no more than about 20% fat-water phase separation; and (2) an amount of the dry product sufficient to provide about 0.36 grams of fat, when dispersed in 50 ml. of black coffee at 175° F., gives a relative reflectance of at least 50%, using an Agtron Model M-500A Reflectometer standardized in the red spectral mode, 640 m.u., with a 00 calibration disc for 0 and a 44 calibration disc for 100% relative reflectance. In the case of a coffee whitener, the amount may be relatively small, e.g., about 1 gram, whereas in a low fat synthetic dried milk a much greater amount would be needed to achieve the 0.36 grams of fat level.

The most preferred end use for products in accordance with the invention is as coffee whiteners or milk and cream substitutes. In practice, the liquid fat-containing dried products in accordance with the invention give relative reflectances essentially equal to conventional hard fat counterparts and have other organoleptic properties which are likewise virtually equal to or better than the conventional non-dairy products. Therefore, a product is provided which has all of the advantages of prior formulations while at the same time using dietetically advantageous polyunsaturated fat therein.

DESCRIPTION OF THE PREFERRED EMBODIMENTS

As noted above, the dried, solid, non-dairy food particles in accordance with the invention broadly include respective fat particles encapsulated by a carbohydrate-containing matrix in order to render the overall food product stable in aqueous emulsion. Referring particularly to the fat portion, the diameter of the fat particle should be no more than about three microns, and preferably less than about one micron. The fat most advantageously has a melting point of no more than about 90° F., and is taken from the group consisting of cottonseed, soybean, corn, peanut, safflower, sunflower, olive, rapeseed, coconut, palm kernel, palm, cocoa butter, sesame, sorghum, babassu, lard, tallow, butter fat, whale, herring menhaden, pilchard, sardine, halibut, synthetic mono-, di- and tri-glycerides, and mixtures thereof. More preferably, the fat is selected from the group consisting of the oils of cottonseed, soybean, corn, peanut, safflower, coconut, palm kernel, sesame and sorghum, and mixtures thereof.

The matrix component should broadly comprise a water soluble carbohydrate and an emulsifier. The carbohydrate portion is normally selected from the group consisting of corn syrup, wheat syrup, sorghum syrup, the malto-dextrins of the aforementioned syrups, and mixtures thereof. The D.E. of the carbohydrates selected should range from about 10 to 70. Most preferably, the carbohydrate is selected from the group consisting of corn syrup and the malto-dextrins thereof, and should have a D.E. of from about 15 to 50. In this connection, the preferred carbohydrate materials are broadly classified as being "water soluble;" however, it is to be understood that this term is to be taken in the broad sense, as opposed to a narrow, technical definition of solubility. That is to say, as long as the carbohydrate materials are capable of being suspended in a substantially uniform and homogenous fashion in an aqueous medium, they meet the dictates of the present invention.

The emulsifier or emulsifiers used in conjunction with the invention are preferably anionic in nature. In certain instances a single emulsifier can be used which is selected from the group consisting of (1) succinylated mono- and mono-diglycerides of edible $C_{12}$–$C_{24}$ fatty acids, and the sodium and potassium salts thereof, and (2) diacetyl tartaric acid esters of mono- and mono-diglycerides of edible $C_{12}$–$C_{24}$ fatty acids, and the sodium and potassium salts thereof. In these cases, the emulsifiers of group (1) and (2) above should be used at a level of from about 0.40 to 6.0% by weight (based upon a 50% solids liquid intermediate prior to drying thereof to yield the final particulate product). This level would of course be from about 0.8 to 12% by weight, based upon the weight of the final dried product.

In many instances it has been found desirable to employ a multiple-component emulsifier system, and decidedly synergistic results have been observed with certain combinations of emulsifiers. Such a system should preferably include at least one emulsifier selected from a first group consisting of (1) stearyl -n- lactylic acids, where n ranges on the average from about 1 to 5, and the sodium, potassium and calcium salts thereof; (2) succinylated mono- and mono-diglycerides of edible $C_{12}$–$C_{24}$ fatty acids, and the sodium and potassium salts thereof, (3) diacetyl tartaric acid esters of mono- and mono-diglycerides of $C_{12}$–$C_{24}$ edible fatty acids, and the sodium and potassium salts thereof, and (4) citric acid esters of mono- and mono-diglycerides of edible $C_{12}$–$C_{24}$ fatty acids, and the sodium and potassium salts thereof. In addition, at least one other emulsifier should be selected from a second group consisting of (1) polyglycerol esters of $C_{12}$–$C_{24}$ edible fatty acids, ranging from 3 to 10 glycerol units and 1 to 10 fatty acids per molecule, (2) polyoxyethylene (20) sorbitan mono-, di- and triesters of $C_{12}$–$C_{24}$ edible fatty acids, (3) ethoxylated mono- and mono-diglycerides of edible $C_{12}$–$C_{24}$ fatty acids, (4) mono-stearyl monoglyceridyl citrate, and the sodium and potassium salts thereof, (5) propylene glycol monoesters of edible $C_{12}$–$C_{24}$ fatty acids, (6) glycerol mono- and mono-diesters of edible $C_{12}$–$C_{24}$ fatty acids, (7) lactylated propylene glycol and glycerol mono- and mono-diesters of edible $C_{12}$–$C_{24}$ fatty acids, (8) acetylated propylene glycol and glycerol mono- and mono-diesters of edible $C_{12}$–$C_{24}$ fatty acids, (9) sorbitan monostearate, (10) lecithin, (11) sucrose esters of edible $C_{12}$–$C_{24}$ fatty acids or mono- and mono-diglycerides, (12) phosphated mono- and mono-diglycerides of edible $C_{12}$–$C_{24}$ fatty acids, and (13) sodium stearyl fumarate.

In such a system, the total amount of emulsifier(s) selected from the first four-membered group should be at least about 0.024% by weight for each one percent by weight of fat present. Use of lesser amounts of the first group emulsifier(s) may give unstable products.

When such a multiple-component system is employed, the overall emulsifier level (i.e., the total quantity of emulsifiers present) should be from about 0.40 to 6.00% by weight, and more preferably from about 0.75 to 3.0% by weight. It will of course be understood that various combinations of emulsifiers may require differing use levels. Exemplary levels of use in connection with these emulsifiers are given in Example III hereunder. Also, specific examples of emulsifiers usable in the invention are given below, along with the trade names and manufacturers thereof.

| Emulsifier | Trade Name | Manufacturer |
| --- | --- | --- |
| diacetyl tartaric acid esters of mono-glycerides | Panodan | Grinsted Products, Inc., of Overland Park, Kansas |
| hexaglycerol distearate | Drewpol 6-2-S | P.V.O. International, Inc., of Boonton, New Jersey |
| distilled succinylated monoglycerides | Myverol SMG | Eastman Chemical Products, Inc., of Kingsport, Tennessee |
| stearyl-2-lactylic acid | SLA | C. J. Patterson Company, of Kansas City, Missouri |
| or | Marvic Acid | Clidden-Durkee, division of SCM Corp., of Cleveland, Ohio |
| mono-diglycerides of fatty acids, 52% alpha mono | Aldo HMSK | Glyco Chemicals, Inc., of Greenwich, Connecticut |
| triglycerol monostearate | Drewpol 3-1-S | P.V.O. International, Inc., of Boonton, New Jersey |
| stearyl monoglyceridyl citrate | | Batter-Lite Corporation, of Milwaukee, Wisconsin |
| diacetyl tartaric acid esters of mono-glycerides, potas- | potassium salt of Panodan | Grinsted Products, Inc. of Overland Park, Kansas |

-continued

| Emulsifier | Trade Name | Manufacturer |
| --- | --- | --- |
| sium salt | | |
| distilled propylene glycol monostearate | Promodan | Grinsted Products, Inc., of Overland Park, Kansas |
| | or | |
| | Myverol P-06 | Eastman Chemical Products, Inc., of Kingsport, Tennessee |
| tetraglycerol monostearate | Poly Aldo 4-1-S | Glyco Chemicals, Inc., of Greenwich, Connecticut |
| distilled succinylated monoglyceride, potassium salt | potassium salt of Myverol SMG-V | Eastman Chemical Products, Inc., of Kingsport, Tennessee |
| distilled monoglyceride derived from hydrogenated cottonseed oil (92% alpha mono) | Myverol 18-07 | Eastman Chemical Products, Inc., of Kingsport, Tennessee |
| polysorbate 60 | Tween 60 | ICI America, Inc., of Wilmington, Delaware |
| distilled propylene glycol mono-ester of stearic acid and palmitic acid | Myverol P-06 | Eastman Chemical Products, Inc., of Kingsport, Tennessee |
| ethoxylated monoglycerides | Aldosperse MS-20 | Glyco Chemicals, Inc., of Greenwich, Connecticut |
| sodium stearyl fumarate | Pruv | Chas. Pfizer Company, of New York City, New York |
| succinylated monoglycerides | Myverol SMG | Eastman Chemical Products, Inc., of Kingsport, Tennessee |
| distilled monoglycerides derived from hydrogenated soybean oil (92% alpha mono minimum) | Myverol 18-06 | Eastman Chemical Products, Inc., of Kingsport, Tennessee |
| distilled monoglycerides from hydrogenated palm oil | Myverol 18-04 | Eastman Chemical Products, Inc., of Kingsport, Tennessee |
| propylene glycol monostearate | Aldo PME | Glyco Chemicals, Inc., of Greenwich, Connecticut |
| citric acid esters of monoglycerides | Acidan | Grinsted Products, Inc., of Overland Park, Kansas |
| sodium stearyl-2-lactylate | Emplex | C. J. Patterson Company, of Kansas City, Missouri |
| lactylated mono-diglycerides | Durlac 100 WK | Glidden-Durkee division of SCM Corporation, of Cleveland, Ohio |
| ethoxylated mono-diglyceride | Santelle EOM(K) | Glidden-Durkee division of SCM Corporation, of Cleveland, Ohio |
| diacetyl tartaric acid esters of monoglycerides, sodium salt | sodium salt of Panodan | Grinsted Products, Inc., of Overland Park, Kansas |
| distilled monoglycerides derived from tallow (92% alpha mono) | Myverol 18-00 | Eastman Chemical Products, Inc., of Kingsport, Tennessee |
| potassium stearyl-2-lactylate | potassium salt of Stearyl-2-Lactylic Acid | C. J. Patterson Company, of Kansas City, Missouri |
| lactylated glycerol and propylene glycol esters of fatty acids | Durlac 300 K | Glidden-Durkee Division of SCM Corporation, of Cleveland, Ohio |
| distilled succinylated monoglycerides from vegetable origin | Myverol SMG-V | Eastman Chemical Products, Inc., of Kingsport, Tennessee |
| distilled monoglycerides from vegetable origin | Myverol 18-98 | Eastman Chemical Products, Inc., of Kingsport, Tennessee |

The food particles in accordance with the invention may also contain optional ingredients for nutritive or organoleptic purposes. For example, such ingredients may be selected from the group consisting of vitamins, minerals, flavoring agents, sweeteners, coloring agents, salts, pH adjustment agents, buffers, stabilizers, amino acids, anti-caking agents, anti-foaming agents and mixtures thereof. Use of specific optional ingredients is described in the Examples hereinafter. In addition, proteinaceous materials can be incorporated if desired; specific materials found to function advantageously in the present invention include animal and plant proteins. The water soluble proteins of cow's milk, lactoglobulin, lactalbumin, and calcium ammonium, potassium and sodium caseinate have proven to be effective as well as low viscosity gelatin and fish protein. Also the cereal grain and oilseed protein concentrates, isolates and modified proteins have particular adaption to the products described. These may be obtained from wheat, rise, corn, barley, oats, rye, sorghum, soybean, cottonseed, peanuts, sunflower, rapeseed, linseed and sesame. The most preferred proteins are sodium caseinate, soybean isolates, enzyme modified soybean isolates and wheat gluten.

In certain applications, buffer or pH control agents have been found to be useful. Typically, these ingredients may include food grade acids or alkalis such as citric acid, fumaric acid, malic acid, acetic acid and sodium, potassium and calcium hydroxide. Alkali metal and alkaline earth salts such as potassium and sodium phosphate, mono, di and tribasic, dicalcium phosphate, and sodium citrate function well singly and in combination as buffers.

The compositions of the invention may also include a stabilizing gum to modify body and mouth feel. Many stabilizers are known and some of those which have been found useful include, but are not limited to, pectins, microcrystalline cellulose, karaya, carrageenan, furcelleran, guar, xanthan, baker's and brewer's yeast glycan, and substituted celluloses such as methyl, ethyl, methyl ethyl and hydroxy propyl and modified starches.

The products in accordance with the invention are initially formulated as a liquid intermediate, followed by spray drying to give a final particulate product. A typical general formula for the preparation of the initial liquid intermediate is as follows:

| | |
|---|---|
| water | 45 to 55% |
| carbohydrate material | 15 to 44% |
| protein (optional) | Up to 8% |
| emulsifier or emulsifier system | 0.4 to 6% |
| liquid fat | 3 to 22% |
| buffer (optional) | up to 2% |

It will be understood that the foregoing ranges are approximate in nature, with all percentages being based upon weight.

The particular procedures involved in formulating the liquid intermediates preferably comprise initially heating the water component to about 90° F., followed by addition of the carbohydrate component with vigorous mixing. This aqueous mixture is then continuously and gradually heated, with mixing, to a final temperature of above 150° F. (e.g., 170° F.). During the heating however, the remaining ingredients are added sequentially. Normally, the oil is added after the carbohydrate material, followed by the emulsifier or emulsifiers. Optional ingredients may be added at various times during the procedure, but are usually added toward the end of the mixing cycle.

The heated and optionally pasteurized mixture is then immediately homogenized in a conventional two-stage homogenizer (e.g., 3500 p.s.i. first stage, 500 p.s.i. second stage), followed by cooling to 40° F. if desired.

The liquid material is then spray dried in order to give the final product. This product in particulate form normally contains the following, on an approximate weight basis:

| | Range (% by wt.) | |
|---|---|---|
| Ingredient | Broad | Preferred |
| 1. Liquid Fat | 6.0–44.0 | 13.0–40.0 |
| 2. Matrix | | |
| a. carbohydrate | 30.0–88.0 | 33.0–80.0 |
| b. emulsifier | .8–12.0 | 1.5–6.0 |
| 3. Residual Water | .1–5.0 | 1.5–3.5 |
| 4. Optional Ingredients | 0–18.0 | 2.0–12.0 |
| 5. Protein (Optional) | 0–16.0 | 0–8.0 |

In order to be successful, the products of the invention must be stable in aqueous emulsion. As used in the present specification and claims, a dried, liquid fat-containing non-dairy food product is said to be "stable" when the following minimum criteria are met:

A. Reconstituted Emulsion Stability

In this test a 25% by volume aqueous dispersion of the product is made by dispersing the appropriate quantity of the dried product in water. A one quart sample of this dispersion is then refrigerated at 40° F. for a period of 72 hours in a glass container. At the end of this period fat separation is measured according to the following index, and an index number is assigned to each five percent increment of fat separated. In order to meet this test, the product must score at least an 8.

| Index Number | Percent Oil Separation |
|---|---|
| 10 | 0 |
| 9+ | 5 |
| 9 | 10 |
| 8+ | 15 |
| 8 | 20 |
| 7+ | 25 |
| 7 | 30 |
| 6+ | 35 |
| 6 | 40 |
| 5+ | 45 |
| 5 | 50 |
| 4 | Emulsion Broken |

B. Whitening Capability

An amount of the dried composition sufficient to provide about 0.36 grams of fat is added and stirred into 50 mls. of freshly brewed black coffee (175° F.) in the sample cup of an Agtron Model M-500A, reflectometer. This unit is standardized in the red spectral mode, 640 m.u., with a 00 calibration disc for zero and a 44 calibration disc for 100% relative reflectance, thereby giving an expanded scale for measurement. The reflectance of the sample is measured using the calibrated reflectometer, and to be acceptable a relative spectral reflectance of at least 50% must be achieved.

In addition to the foregoing tests A and B, the following criteria are also advantageous especially in connection with a coffee whitening product; however, meeting standards C and D is not an absolute prerequisite for "stability" in accordance with the invention; particularly with respect to synthetic milks and the like.

C. Oiling or Oil Separation

In this test three grams of the dried composition is added to 150 mls. of 175° F. black coffee in a 200 ml. Pyrex tallform beaker. The mixture is then gently stirred and allowed to stand for two minutes. At the end of this period, the surface of the mixture is examined, and any oil droplets on the 5 cm. diameter surface are counted. The rating is as follows:

| Rating | No. of Droplets |
|---|---|
| 10 | None |
| 9 | 1–5 |
| 8 | 6–10 |
| 7 | 11–15 |
| 6 | 16–20 |
| 5 | Over 20 |

To be acceptable, the product must achieve a rating of at least 8.

D. Feathering—Precipitation

After counting the oil droplets as described in test C, the coffee-product mixture is allowed to stand for a further 3 minutes. The mixture is first examined for precipitation, and if any precipitation or flocculation is observed, the product is unsatisfactory. At the same time, feathering is measured according to the following scale:

| Rating | Degree of Feathering |
|---|---|
| 10 | Total absence of feathering |
| 9 | Slight amount of feathering |
| 8 | Moderate amount of feathering |
| 7 | Heavy feathering |

To be acceptable, a product must have a rating of at least 8 (no precipitation and moderate feathering).

The following Examples will illustrate the preferred products and procedures in accordance with the invention. In addition, in Example V, the synergistic effect of employing a multiple component emulsifier system is demonstrated. It should be understood that although the following Examples are illustrative of the invention, nothing therein is to be taken as a limitation on the overall scope of the invention.

EXAMPLE I

SPRAY DRIED NON-DAIRY MILK CONCENTRATE

TABLE 1

| [1]Temperature °F. | [2]Hold Time (Min.) | Ingredients | % by Weight |
|---|---|---|---|
| 85 | | Water | 55.6220 |
| | | Corn syrup solids 19 D.E. (Anheuser-Busch, Inc.) | 30.0000 |
| 110 | 1 | Sorbitol | 1.0000 |
| 145 | | Beta carotene | .0020 |
| | | Corn oil (P/S ratio = 5.1) CPC International, Inc. | 11.6660 |
| | | Stearyl-2-lactylic acid | .4000 |
| 150 | | Mono-diglycerides of fatty acids, 52% alpha mono (Aldo HMSK, Glyco Chemicals, Inc.) | .2100 |
| | | Triglycerol monostearate Drewpol 3-1-S (PVO International, Inc.) | .4800 |
| 160 | 2 | Stearyl monoglyceridyl citrate (Batter-Lite Corporation) | .2200 |
| | | Sodium chloride | .0900 |
| | | Dipotassium phosphate | .2300 |
| 175 | 1 | Artificial milk flavor (Grinsted Products, Inc.) | .0800 |
| | | | 100.0000 |

[1]Refers to the temperature of the mixture in the vessel at the time of addition of the corresponding ingredients.
[2]Refers to hold time, with agitation but without steam injection, after addition of the ingredients.

A liquid non-dairy milk was prepared using the ingredients listed in Table 1 and according to the following procedures.

A stainless steel mixing vessel was employed. The vessel was equipped with an agitator and had a conical lower section. The vessel also included a lower outlet coupled to recirculation conduit and pump for recirculating liquid from the bottom of the vessel back to the top thereof. The piping from the vessel pump also included a diversion valve to convey the final product to a conventional two-stage Gaulin homogenizer, and then on to a chilled water (38° F.) plate and/or surface chiller. The vessel was also equipped with a steam injection unit for directly heating and agitating the product during processing.

Following the particular order of ingredients listed in Table 1, the corn syrup solids were first combined with 90° F. deionized water in the stainless steel mixing vessel with continuous vigorous agitation. Following complete dispersion of these ingredients, steam injection was initiated. At 110° F. the sorbitol was added with one minute hold time mixing without steam injection. After hold time period, steam injection is resumed to continue heating the mixture. Beta carotene, corn oil, and stearyl-2-lactylic acid were added at a temperature of 145° F.; the mono-diglycerides and triglycerol monostearate at 150° F.; the citrate, salt and phosphate at 160° F., with two minutes hold time mixing; and finally the milk flavor at 170° F., with one final minute of mixing. The pasteurized mixture was thereafter immediately homogenized at 3500 psi, first stage; 500 psi second stage, through the Gaulin two-stage homogenizer followed by cooling to 40° F.

This and all other spray drying experiments described herein were performed using an Anhydro Laboratory Spray Dryer Size No. 1, (Anhydro, Inc., 165 John L. Dietsch Square, Attleboro Falls, Mass. 02763). The dryer was equipped with a ¼ inch JSS #4 dual (product -air) nozzle for upward vertical air atomization. The spray dryer was also equipped with a Bosch motor driven centrifugal atomizer CD-63 with atomizer wheel spaced at 0.6 mm. and capable of rotation at speeds from 0 to 50,000 R.P.M. This dryer has the evaporation capacity of approximately 5.5 Kg/hr. at an inlet temperature of 250° C., outlet temperature 90° C.

The spray dryer was readied according to the manufacturer's instructions and the electrical power, fan and heating elements were actuated. The air pressure to the dual nozzle was adjusted to 15 lbs./sq. in. The dryer was adjusted to heat the incoming filtered air to approximately 200° C., and water flow from the feed bowl to the nozzle was adjusted to maintain an outlet temperature of 90° C. The temperatures were allowed to equilibrate, water flow was stopped, and the product made as described above was pumped to the nozzle. Rate of flow through the nozzle was then adjusted to maintain an outlet temperature of 88°-93° C. The dryer was allowed to operate with conditions unchanged until one liter of the emulsion concentrate had been dried. Yield of dried product was approximately 300 grams.

The above spray dried material was analyzed with the following results:

| | |
|---|---|
| Moisture | 0.64% |
| Fat | 27.43% |
| pH (10% aqueous) | 6.77 |
| Water dispersability | Good |
| Emulsion stability | 9+ |
| Whitening power (Agtron 1.3 gms/50 ml. coffee) | About 58% relative reflectance |
| Oil separation | 10 |
| Feathering-precipitation | 9 |

0.5% by weight Syloid 244 silica gel was added to the dried product, and this was reconstituted to an aqueous solution by adding, with stirring, 1 part of powder to 5.5 parts of room temperature tap water. The resultant non-dairy fluid milk was cooled to 40° F. and organoleptically evaluated. The chilled product exhibited a bland milk-like flavor, no odor, good mouth feel, and generally had the appearance and handling characteristics of homogenized whole milk. After refrigeration (40° F.) for 7 days, the product still appeared homogeneous and presented the same properties as did the initially reconstituted product.

EXAMPLE II

SPRAY DRIED PROTEINLESS NON-DAIRY CREAMER

TABLE 2

| Temperature °F. | Hold Time (Min.) | Ingredients | % by Weight |
|---|---|---|---|
| 90 | | Water | 43.2900 |
| 140 | 2 | Corn syrup 35 D.E. | 36.0000 |
| | | Diacetyl tartaric acid esters of monoglycerides | .3000 |
| | | Hexaglycerol distearate | .3000 |
| | | Succinylated monoglycerides (Distilled) | .5400 |
| 155 | 1 | Distilled glycerol monostearate derived from hydrogenated soybean oil | .1200 |
| 175 | 2 | Soybean oil (P/S ratio-3.0) | 18.0000 |
| | | Annatto color | .0400 |
| 195 | 1 | Dipotassium phosphate | 1.4100 |
| | | | 100.0000 |

The dried, non-dairy creamer product was prepared using the same techniques as described in Example I and about 7 liters of the liquid concentrate of this Example was cooled and spray dried as described, giving a yield of about 3,000 grams.

The spray dried material was analyzed with the following results:

| | |
|---|---|
| Moisture | 1.29% |
| Fat | 35.93% |
| pH (10% aqueous) | 7.10 |
| Water dispersability | Good |
| Emulsion stability | 9+ |
| Whitening power (Agtron- 1.0 gms/50 ml. coffee) | About 65% relative reflectance |
| Oil Separation | 10 |
| Feathering-precipitation | 9+ |

The spray dried proteinless non-dairy creamer was reconstituted (with 0.5% by weight sodium silico aluminate being added to the dried product) to an aqueous solution by addition, with stirring, one part of powder to three parts of room temperature tap water. The resultant non-dairy fluid creamer was cooled to 40° F. and organoleptically evaluated. The chilled product exhibited a bland flavor, no odor, good mouth feel, and generally had the appearance and handling characteristics of natural cream. After refrigeration (40° F.) for 7 days, the product still appeared homogeneous and presented the same properties as did the initially reconstituted product.

The dry creamer was also added directly to freshly brewed 175° F. black coffee on the basis of 2.5 grams to 100 mls. The product functioned in the same manner as fresh table cream producing a light creamy appearance with the complete absence of oiling off, and feathering was found to be less than a control prepared with fresh natural cream.

Following an accelerated dry stability study for a 30-day period whereby the product was stored in clear glass at 100° F. without benefit of an inert gas blanket, the product was found to be free-flowing and exhibited the excellent characteristics found initially.

A further experiment was conducted employing this spray dried proteinless creamer. A 25% aqueous solution was prepared with agitation and the product was homogenized at 3000-500 psi, first and second stages respectively and chilled to 40° F. The chilled product again exhibited a bland flavor without odor, good mouth feel and had the general appearance and handling characteristics of fresh cream. This product was placed in the −10° F. freezer and freeze-thaw cycles were commenced whereby the product, after being frozen solid, was thawed to 40° F., examined and refrozen. No breakdown or separation was observed following four freeze-thaw cycles, and the product exhibited excellent whitening characteristics with the absence of oiling and minimum feathering throughout the entire study.

EXAMPLE III

SPRAY DRIED NON-DAIRY CREAMER USING SINGLE EMULSIFIER

TABLE 3

| Temperature °F. | Hold Time (Min.) | Ingredients | % by Weight |
|---|---|---|---|
| 80 | | Water | 41.43 |
| 120 | 2 | Corn syrup 35 D.E. | 36.00 |
| 140 | 1 | Diacetyl tartaric acid esters of monoglycerides | 2.52 |
| 160 | 1 | Soybean oil | 18.00 |
| | | Annatto color | .04 |
| | | Cream flavor | .60 |
| 174 | 1 | Dipotassium phosphate | 1.41 |
| | | | 100.00 |

The procedure and equipment described in Example I was used. The resultant pasteurized concentrate was homogenized at 3500 psi, 500 psi, first and second stages respectively, and spray dried yielding 4480 grams from a 10,000 gram batch weight.

The resultant dried powder was analyzed with the following results:

| | |
|---|---|
| Moisture | 2.03% |
| Fat | 36.07% |
| pH (10% aqueous) | 6.20 |
| Water dispersability | Good |
| Emulsion stability | 9 |
| Whitening power (Agtron) | 69% relative reflectance |
| Oil separation | 10 |
| Feathering-precipitation | 10 |

From the data obtained, it was concluded that an excellent dry coffee creamer can be formulated employing diacetyl tartaric acid esters of monoglycerides as the sole emulsifier, and further that the physical properties of the product are at least equivalent to the dry solid fat creamers of commerce.

EXAMPLE IV

SPRAY DRIED NON-DAIRY CREAMER USING SINGLE EMULSIFIER

TABLE 4

| Temperature °F. | Hold Time (Min.) | Ingredients | % by Weight |
|---|---|---|---|
| 90 | | Water | 42.69 |
| 140 | 2 | Corn syrup 36 D.E. | 36.00 |
| | | Succinylated monoglycerides | 1.26 |
| 155 | 1 | Soybean oil | 18.00 |
| | | Annatto color | .04 |
| | | Cream flavor | .60 |
| 175 | 1 | Dipotassium phosphate | 1.41 |
| | | | 100.00 |

Employing the same techniques and equipment as described in Example I, the non-dairy creamer liquid concentrate was pasteurized, homogenized, at 3500 psi first stage, 500 psi second stage, and spray dried yielding about 4700 grams of a dry free-flowing powder from a 10,000 gram concentrate batch weight.

The spray dried material was assayed with the result as follows:

| | |
|---|---|
| Moisture | 1.70% |
| Fat | 35.68% |
| pH (10% aqueous) | 6.90 |
| Water dispersability | Good |
| Emulsion stability | 9+ |
| Whitening (Agtron) | About 67% relative reflectance |
| Oil separation | 10 |
| Feathering | 10 |

From the foregoing, it was concluded that the spray dried creamer formulated with a liquid oil functioned in a manner comparable to a commercial hard fat non-dairy creamer.

EXAMPLE V

In order to demonstrate the synergistic effect obtained through the use of the preferred multiple-component emulsifier systems hereof, the following comparative study was undertaken.

First, respective multiple-component emulsifier systems were selected and used in the formulation of dry powdered non-dairy products in accordance with the invention. In all cases, liquid intermediates having 50% by weight solids were prepared using the following ingredients, with corn syrup level being adjusted to maintain the 50% solids content:

TABLE 5

| Temperature °F. | Hold Time (Min.) | Ingredients | Percent |
|---|---|---|---|
| | | Water | 42.85 |
| 80 | | 36 D.E. Corn Syrup (80% solids) | Variable |
| 100 | | Soy Protein Isolate | 1.00 |
| 140 | | Emulsifier System | Variable |
| 150 | | Soybean Oil (P/S ratio 2.9) | 18.00 |
| | | Annatto Food Color | .04 |
| | | Cream Flavor | .11 |
| 175 | 2 | Dipotassium Phosphate | 1.50 |

Also, the components of the respective emulsifier systems were tested alone using the same ingredients and procedures. In two-component systems, twice the amount of each emulsifier was separately used relative to the amount thereof used in the corresponding emulsifier system; likewise, in three-component systems, three times the amount of each emulsifier was separately used relative to the amount thereof used in the corresponding emulsifier system.

Each test composition was made in the manner set forth in Example I, using the addition and temperature schedules given in Table 3.

The resultant dried products were then tested for stability using three of the tests described previously, i.e., Reconstituted Emulsion Stability, Oiling and Feathering-Precipitation. Also, a modified whitening test was used wherein four grams of the dried preparations were stirred into 150 mls. of freshly brewed 175° F. black coffee and compared with a commercial, hard fat, powdered creamer similarly tested in black coffee. Whitening ability was recorded with a rating of ten being excellent, seven considered acceptable, and four or below indicating inadequate emulsion stability. The results of these comparative tests are set forth in Table 6:

TABLE 6

| Emulsifier System | Percent | Reconstituted Emulsion Stability 72 hrs. at 40° F. | Whitening Capability | Oiling | Feathering |
|---|---|---|---|---|---|
| SYSTEM A | | | | | |
| Sodium stearyl-2-lactylate | .365 | | | | |
| | | 9+ | 9 | 7 | 8 |
| [1]DATEM | .574 | | | | |
| Controls | | | | | |
| Sodium stearyl-2-lactylate | .730 | 8 | 7 | 6 | 6 |

TABLE 6-continued

| Emulsifier System | Percent | Reconstituted Emulsion Stability 72 hrs. at 40° F. | Whitening Capability | Oiling | Feathering |
|---|---|---|---|---|---|
| DATEM | 1.150 | 8 | 7 | 5 | 6 |
| SYSTEM B | | | | | |
| Succinylated monoglycerides | .311 | | | | |
| | | 9+ | 9 | 10 | 10 |
| Hexaglycerol distearate | .628 | | | | |
| Controls | | | | | |
| Succinylated monoglycerides | .621 | 9 | 8+ | 8 | 10 |
| Hexaglycerol distearate | 1.256 | 5 | 2 | 8 | 9 |
| SYSTEM C | | | | | |
| Stearyl monoglyceridyl citrate | 1.735 | | | | |
| | | 7+ | 5 | 7 | 9 |
| Triglycerol monostearate | .446 | | | | |
| Controls | | | | | |
| Stearyl monoglyceridyl citrate | 3.470 | 6 | 4 | 4 | 9 |
| Triglycerol monostearate | .930 | 5 | 2 | 5 | 9 |
| SYSTEM D | | | | | |
| Acetylated monoglycerides | 2.606 | | | | |
| | | 9+ | 9 | 10 | 8 |
| DATEM | .574 | | | | |
| Controls | | | | | |
| Acetylated monoglycerides | 5.210 | 4 | 1 | 1 | 1 |
| DATEM | 1.150 | 8 | 7 | 5 | 6 |
| SYSTEM E | | | | | |
| Succinylated monoglycerides | .31 | | | | |
| | | 9+ | 9+ | 9+ | 8 |
| Sodium stearyl-2-lactylate | .36 | | | | |
| Controls | | | | | |
| Succinylated monoglycerides | .621 | 9 | 8+ | 8 | 10 |
| Sodium stearyl-2-lactylate | .73 | 8 | 7 | 6 | 6 |
| SYSTEM F | | | | | |
| Succinylated monoglycerides | .44 | | | | |
| | | 10 | 10 | 10 | 10 |
| Distilled monoglycerides (90% alpha) | .22 | | | | |
| Controls | | | | | |
| Succinylated monoglycerides | .88 | 9+ | 10 | 10 | 10 |
| Distilled monoglycerides (90% alpha) | .44 | 4 | 1 | 1 | 1 |
| SYSTEM G | | | | | |
| Succinylated monoglycerides | .207 | | | | |
| DATEM | .382 | 9+ | 10 | 9 | 10 |
| Sodium stearyl-2-lactylate | .243 | | | | |
| Controls | | | | | |
| Succinylated monoglycerides | .621 | 9 | 8+ | 8 | 10 |
| DATEM | 1.150 | 8 | 7 | 5 | 6 |
| Sodium stearyl-2-lactylate | .730 | 8 | 7 | 6 | 6 |
| SYSTEM H | | | | | |
| Triglycerol monostearate | .31 | | | | |
| Polysorbate 60 | .40 | 8+ | 8 | 5 | 9 |
| Sodium stearyl-2-lactylate | .24 | | | | |
| Controls | | | | | |
| Triglycerol monostearate | .93 | 5 | 2 | 5 | 9 |
| Polysorbate 60 | 1.215 | 4 | 1 | 1 | 1 |
| Sodium stearyl-2-lactylate | .73 | 8 | 7 | 6 | 6 |
| SYSTEM I | | | | | |
| Hexaglycerol distearate | .418 | | | | |
| Citric acid esters of monoglycerides | 1.157 | 9 | 9+ | 10 | 10 |
| Succinylated monoglycerides | .206 | | | | |
| Controls | | | | | |
| Hexaglycerol distearate | 1.256 | 4 | 2 | 8 | 9 |
| Citric acid esters of monoglycerides | 3.470 | 8 | 8 | 9 | 10 |
| Succinylated monoglycerides | .621 | 8+ | 9 | 8 | 7 |
| SYSTEM J | | | | | |
| DATEM | .20 | | | | |
| Hexaglycerol distearate | .20 | 10 | 10+ | 10 | 10 |
| Succinylated monoglycerides | .22 | | | | |
| Controls | | | | | |
| DATEM | 1.150 | 8 | 7 | 5 | 6 |
| Hexaglycerol distearate | 1.256 | 4 | 2 | 8 | 9 |
| Succinylated monoglycerides | .621 | 8+ | 9 | 8 | 7 |
| SYSTEM[2] K | | | | | |
| Sodium stearyl-2-lactylate | .365 | 9 | 9 | 9+ | 10 |
| Stearyl monoglyceridyl citrate | 1.735 | | | | |
| Controls | | | | | |

TABLE 6-continued

| Emulsifier System | Percent | Reconstituted Emulsion Stability 72 hrs. at 40° F. | Whitening Capability | Oiling | Feathering |
|---|---|---|---|---|---|
| Sodium stearyl-2-lactylate | .73 | 8+ | 9 | 9 | 9 |
| Stearyl monoglyceridyl citrate | 3.47 | 8 | 8 | 10 | 9 |
| SYSTEM L | | | | | |
| Sodium stearyl-2-lactylate | .365 | 9+ | 10 | 10 | 10 |
| DATEM | .574 | | | | |
| Controls | | | | | |
| Sodium stearyl-2-lactylate | .730 | 9 | 8+ | 9 | 9 |
| DATEM | 1.150 | 8+ | 8 | 8 | 9 |

[1] DATEM refers to diacetyl tartaric acid esters of mono- and mono-diglycerides
[2] Same overall formula except 3% less oil used with 3% extra corn syrup A review of Table 6 will illustrate the synergistic effect achieved using the preferred emulsifier systems of the invention. For example, in System A the controls gave respective test scores which were closely similar; yet when the amounts of these controls were halved and used in combination, the expected results (i.e., test scores which were an average of the control scores) were surpassed. This same pattern is followed throughout the data, thus unequivocally establishing the synergistic effect.

EXAMPLE VI

U.S. Pat. No. 3,695,889 describes a liquid non-dairy product containing polyunsaturated fat. This patent does not describe a dried product; however, in order to demonstrate that the liquid products of this patent cannot be simply dried to give an acceptable product, the following test was undertaken.

Example 2, column 4, lines 40–62 of U.S. Pat. No. 3,695,889 was repeated as follows:

| Ingredients | Percent | Grams |
|---|---|---|
| Water | 86.60 | 8660 |
| Dipotassium phosphate | 0.20 | 20 |
| Sodium caseinate | 1.60 | 160 |
| Sucrose | 1.00 | 100 |
| Polysorbate 60 | 0.15 | 15 |
| Sodium stearoyl-2-lactylate | 0.15 | 15 |
| Propylene glycol monostearate | 0.30 | 30 |
| Soybean oil (P/S ratio 2.9) | 10.00 | 1000 |
| | 100.00 | 100.00 |

The dipotassium phosphate, sodium caseinate, sucrose, polysorbate 60, stearoyl lactylate, and propylene glycol monostearate were added to the water and mixed in a Groen stainless steel jacketed mixing vessel at room temperature. The vegetable oil was then added and all the ingredients were thoroughly dispersed. With continued stirring the mixture was then heated and pasteurized at 175° F., homogenized through a Gaulin homogenizer at an approximate temperature of 160° F. and a pressure of 3000 p.s.i.g. The resultant product was spray dried in an Anhydro laboratory spray dryer. An extremely low yield of a dry powdered product resulted because of product adherence to the sides of the dryer.

The functional stability of this product was determined by means of the Whitening Capability test described above. Three grams of the dried composition was stirred into 150 mls. of 175° F. black coffee. A 50 ml. aliquot was transferred to an Agtron Model M-500A reflectometer sample cup and relative spectral reflectance was measured in the red spectral mode. A value of eleven was observed. A minimum spectral reflectance of at least fifty is required for a product to be acceptable. In fact, the powder lightened coffee only slightly, resulting in a medium dark brown color. Substantial oiling, oil droplets too numerous to count, and excessive foaming were also observed.

It was concluded that the non-dairy cereal blend described in Example 2 U.S. Pat. No. 3,695,889 cannot be satisfactorily spray dried to give an acceptable product.

Having thus desired the invention what is claimed as new and desired to be secured by Letters Patent is:

1. A dried, solid, liquid fat-containing coffee whitener or liquid dairy product replacement food particle, comprising:

a particle of fat having a diameter of no more than about 3 microns, said fat being flowable at about room temperature; and an encapsulating matrix around said fat particle including at least one emulsifier and a carbohydrate material with a D.E. ranging from 10 to 70 selected from the group consisting of corn syrup, wheat syrup, sorghum syrup, the maltodextrins of the aforementioned syrups, and mixtures thereof, a plurality of said food particles having stability such that:

A. a 25% by volume dispersion thereof in water, when stored at 40° F. for 72 hours, exhibits no more than about 20% fat-water phase separation;

B. a quantity of said particles sufficient to provide a total of about 0.36 grams of fat, when dispersed in 50 mls. of black coffee at 175° F., gives a relative reflectance of at least 50%, using an Agtron Model M-500A reflectometer standardized in the red spectral mode, 640 m.u., with a 00 calibration disc for zero and a 44 calibration disc for 100% relative reflectance;

C. three grams of said food particles added to 150 mls. of 175° F. black coffee in a container having a 5 cm. diameter, followed by gentle stirring and allowing the mixture to stand for two minutes, exhibits no more than about 10 oil droplets on the surface of the mixture; and D. taking the mixture derived from test (C) hereof, and allowing the same to stand for an additional 3 minutes, the mixture exhibits essentially no precipitation or flocculation, and no more than a moderate amount of feathering.

2. The food particle as set forth in claim 1 wherein said fat has a melting point of no more than about 90° F.

3. The food particle as set forth in claim 1 wherein said fat particle has a diameter of less than about 1 micron.

4. The food particle as set forth in claim 1 wherein said fat is taken from the group consisting of cottonseed, soybean, corn, peanut, safflower, sunflower, olive, rapeseed, coconut, palm kernel, palm, cocoa butter, sesame, sorghum, babassu, lard, tallow, butter fat, whale, herring, menhaden, pilchard, sardine, halibut, synthetic glycerides, and mixtures thereof.

5. The food particle as set forth in claim 4 wherein said fat is selected from the group consisting of the oils of cottonseed, soybean, corn, peanut, safflower, coconut, palm kernel, sesame and sorghum and mixtures thereof.

6. The food particle as set forth in claim 1 wherein said carbohydrate is selected from the group consisting of corn syrup and maltodextrins thereof having a D.E. of from about 15 to 50.

7. The food particle as set forth in claim 1 wherein said carbohydrate material is water soluble.

8. The food particle as set forth in claim 7 wherein said emulsifier is selected from the group consisting of (1) succinylated mono- and mono-diglycerides of edible $C_{12}$–$C_{24}$ fatty acids, and the sodium and potassium salts thereof, and (2) diacetyl tartaric acid esters of mono- and mono-diglycerides of edible $C_{12}$–$C_{24}$ fatty acids, and the sodium and potassium salts thereof.

9. The food particle as set forth in claim 8 wherein said emulsifier is present at a level of from about 0.8 to 12.0% by weight.

10. The food particle as set forth in claim 7 wherein said emulsifier comprises an emulsifier system having:
   A. At least one emulsifier selected from a first group consisting of:
      (1) stearyl -n- lactylic acids, where n ranges on the average from about 1 to 5, and the sodium, potassium and calcium salts thereof;
      (2) succinylated mono- and mono-diglycerides of edible $C_{12}$–$C_{24}$ fatty acids, and the sodium and potassium salts thereof,
      (3) diacetyl tartaric acid esters of mono- and mono-diglycerides of $C_{12}$–$C_{24}$ edible fatty acids, and the sodium and potassium salts thereof, and
      (4) citric acid esters of mono- and mono-diglycerides of edible $C_{12}$–$C_{24}$ fatty acids and the sodium and potassium salts thereof; and
   B. At least one emulsifier selected from a second group consisting of:
      (1) polyglycerol esters of $C_{12}$–$C_{24}$ edible fatty acids, ranging from 3 to 10 glycerol units and 1 to 10 fatty acids per molecule,
      (2) polyoxyethylene (20) sorbitan mono-di- and triesters of $C_{12}$–$C_{24}$ edible fatty acids,
      (3) ethoxylated mono- and mono-diglycerides of edible $C_{12}$–$C_{24}$ fatty acids,
      (4) stearyl monoglyceridyl citrate, and the sodium and potassium salts thereof,
      (5) propylene glycol monoesters of edible $C_{12}$–$C_{24}$ fatty acids,
      (6) glycerol mono- and mono-diesters of edible $C_{12}$–$C_{24}$ fatty acids,
      (7) lactylated propylene glycol and glycerol mono- and mono-diesters of edible $C_{12}$–$C_{24}$ fatty acids,
      (8) acetylated propylene glycol and glycerol mono- and mono-diesters of edible $C_{12}$–$C_{24}$ fatty acids,
      (9) sorbitan monostearate,
      (10) lecithin,
      (11) sucrose esters of edible $C_{12}$–$C_{24}$ fatty acids, or mono- and mono-diglycerides,
      (12) phosphated mono- and mono-diglycerides of edible $C_{12}$–$C_{24}$ fatty acids, and
      (13) sodium stearyl fumarate.

11. The food particle as set forth in claim 10 wherein the total quantity of emulsifier or emulsifiers taken from Group A is at least about 0.024 weight percent per each one percent of the fat in the food particle.

12. The food particle as set forth in claim 1 wherein said fat comprises from about 6 to 44% by weight of said particle.

13. The food particle as set forth in claim 11 wherein said fat content is from about 13.0 to 40.0% by weight.

14. The food particle as set forth in claim 1 wherein said matrix further includes supplemental amounts of ingredients selected from the group consisting of vitamins, minerals, flavoring agents, sweeteners, coloring agents, salts, pH adjustment agents, buffers, stabilizers, amino acids, anti-caking agents, anti-foaming agents and mixtures thereof.

15. The food particle as set forth in claim 12 wherein said emulsifier system is present at a level of from about 0.8 to 12.0% by weight.

16. The food particle as set forth in claim 1 wherein:
   said fat as said fat particle has a melting point of no more than about 90° F. and is present at a level of from about 6.0 to 44.0% by weight;
   said matrix includes:
   a carbohydrate material having a D.E. of from about 15 to 50 and selected from the group consisting of corn syrups and the malto-dextrins thereof and present at a level of from about 30.0 to 88.0% by weight;
   an emulsifier system comprising at least two anionic emulsifiers, at least one of said emulsifiers being selected from the group consisting of (1) sodium stearyl-2-lactylate, (2) succinylated mono-and mono-diglycerides of edible $C_{12}$–$C_{24}$ fatty acids, (3) diacetyl tartaric acid esters of mono- and mono-diglycerides in their acid or salt form, and (4) citric acid esters of mono and mono-diglycerides of edible $C_{12}$–$C_{24}$ fatty acids, and the sodium and potassium salts thereof, said emulsifier system being present at a level of from about 0.8 to 12.0% by weight.

17. The food particle as set forth in claim 16 wherein said matrix includes up to about 16.0% by weight protein.

* * * * *